United States Patent [19]

Nelis

[11] Patent Number: 4,838,025

[45] Date of Patent: Jun. 13, 1989

[54] HYDRAULIC MOTOR WITH BUOYANT TUBULAR MEMBERS

[76] Inventor: Marc Nelis, 10340 Boul. Olympia, Montreal, Quebec, Canada, H2C 2W2

[21] Appl. No.: 146,026

[22] Filed: Jan. 20, 1988

[51] Int. Cl.$^4$ ............................................. F03C 1/02
[52] U.S. Cl. ...................................... 60/505; 60/507; 60/639; 60/398
[58] Field of Search ................. 60/398, 473, 495, 497, 60/496, 500, 505, 507, 639

[56] References Cited

U.S. PATENT DOCUMENTS

| | | | |
|---|---|---|---|
| 685,269 | 10/1901 | Fulton | 60/507 X |
| 1,550,408 | 8/1925 | Witt | 60/496 |
| 4,249,639 | 2/1981 | Vukovic | 60/507 X |
| 4,305,003 | 12/1981 | Basurto et al. | 60/497 X |
| 4,324,099 | 4/1982 | Palomer | 60/497 |
| 4,674,281 | 6/1987 | Kim et al. | 60/496 |

*Primary Examiner*—Robert E. Garrett
*Assistant Examiner*—M. Williamson
*Attorney, Agent, or Firm*—Samuel Meerkreebs

[57] ABSTRACT

A hydraulic motor comprises at least two tanks each having an arrangement of upper and lower telescoped, relatively reciprocating tubular members. The lower tubular member extends from the bottom of the tank, the upper tubular member being guided during reciprocation. A liquid contained in the tanks is capable of floating each upper tubular member relative to the lower tubular member associated therewith. Each upper and lower tubular member arrangement forms a variable volume chamber containing a gaseous fluid. The variable volume chambers communicate with each other for equalizing the pressure therebetween. The tubular members of the respective chambers being alternately floated as the respective tanks are filled with and emptied of the liquid to cause commensurate, alternate reciprocation of the upper tubular members. A mechanical energy source is provided due to such a reciprocation.

21 Claims, 5 Drawing Sheets

HYDRAULIC MOTOR WITH BUOYANT TUBULAR MEMBERS

BACKGROUND OF THE INVENTION

1. Field of the Invention

The present invention relates to a hydraulic motor, and more particularly, to a novel motor in which variable volume floats are used in a piston-like manner to transmit power to a shaft or the like for remote use thereof.

2. Description of the Prior Art

Patents pertaining to this art date back to early in the century. U.S. Pat. Nos. 921,637, 1909, Vanderslice, and 1,557,290, 1925, Ippolito, both disclose a hydraulic motor in which the bouyant forces of water are used to alternately raise a pair of floats thereby imparting a rocking movement to a beam connected therebetween. U.S. Pat. No. 989,873, 1911, Rates et al, discloses a water motor in which both the buoyant forces of the water and the gravity forces thereof are alternatively used to impart a rocking movement to a beam.

Variations reside in the designs of the channeling control means for alternatively admitting the input water into the various compartments of the motors as well as the valve and control means for alternatively discharging the water from the compartments.

Such hydraulic motors are impractical. Only in water-rich, under-developed countries and perhaps in remote areas can such hydraulic motors be of use. All of the above patents disclose motors producing a power output directly proportional to the amount of water used as the various receptacles must be completely filled with water to generate forces that result in power being developed. However, the present aforementioned areas of use for hydraulic motors are normally characterized by water scarceness.

SUMMARY OF THE INVENTION

It is, therefore, an aim of the present invention to provide an improved hydraulic motor characterized by a simple structure wherein a minimum amount of water is used to produce power.

It is also an aim of the present invention to use air as a replacement for a maximum amount of water.

It is a further aim of the present invention to alternately transfer air from one float to another, thereby providing the hydraulic motor with floats of variable volume and constant air pressure.

A construction in accordance with the present invention comprises a hydraulic motor including at least first and second tank means each having a bottom wall and a peripheral upstanding side wall for containing water. An upstanding first tubular member which is open-ended at the top extends upwardly from the bottm wall and is spaced inwardly from the side wall of the tank means and defines a space therewith. A second tubular member has a top wall and a peripheral side wall transversely dimensioned for telescoping onto the first tubular member and within the tank means. Guide means guides the telescopic reciprocating movement of the second tubular member relative to the first tubular member. Means supply water from a water supply source to the space between the side wall of the first tubular member and the side wall of the tank means. The water is effective to float the second tubular member and move it along the guide means to an upper limit in the tank means from a lower limit therein, i.e., to a telescopic extended position relative to the first tubular member from a telescopic compressed position. A gaseous fluid is provided within the variable volume chambers each defined by the first and second telescopic tubular members arrangement and within a conduit means communicating between the chambers, in order to maintain a constant pressure therein. Means are provided for alternately supplying to and exhausting water from the first and second tank means, whereby the telescopic first and second tubular arrangements in the respective tank means are alternately extended and compressed by means of the water rising or lowering in the space in the respective tank means. Means are coupled to the second tubular members in each of the first and second tank means for extracting the mechanical energy derived from the reciprocating movement thereof.

A further construction in accordance with the present invention comprises a hydraulic motor including at least a tubing means used for connecting, in a substantially horizontal way, openings defined on the side wall of each tank means. The openings are defined thereon at a level for allowing gravity transfer of substantially half the water required for moving the second tubular member from the compressed position thereof to the extended position thereof from the tank means associated with the second tubular member in the extended position thereof to the tank means associated with the second tubular member in the compressed position thereof. Each stroke of the second tubular members thus requires only substantially half the water therefor from the water supply source, as the remainder of the water required is transferred between the tank means by way of the tubing means.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
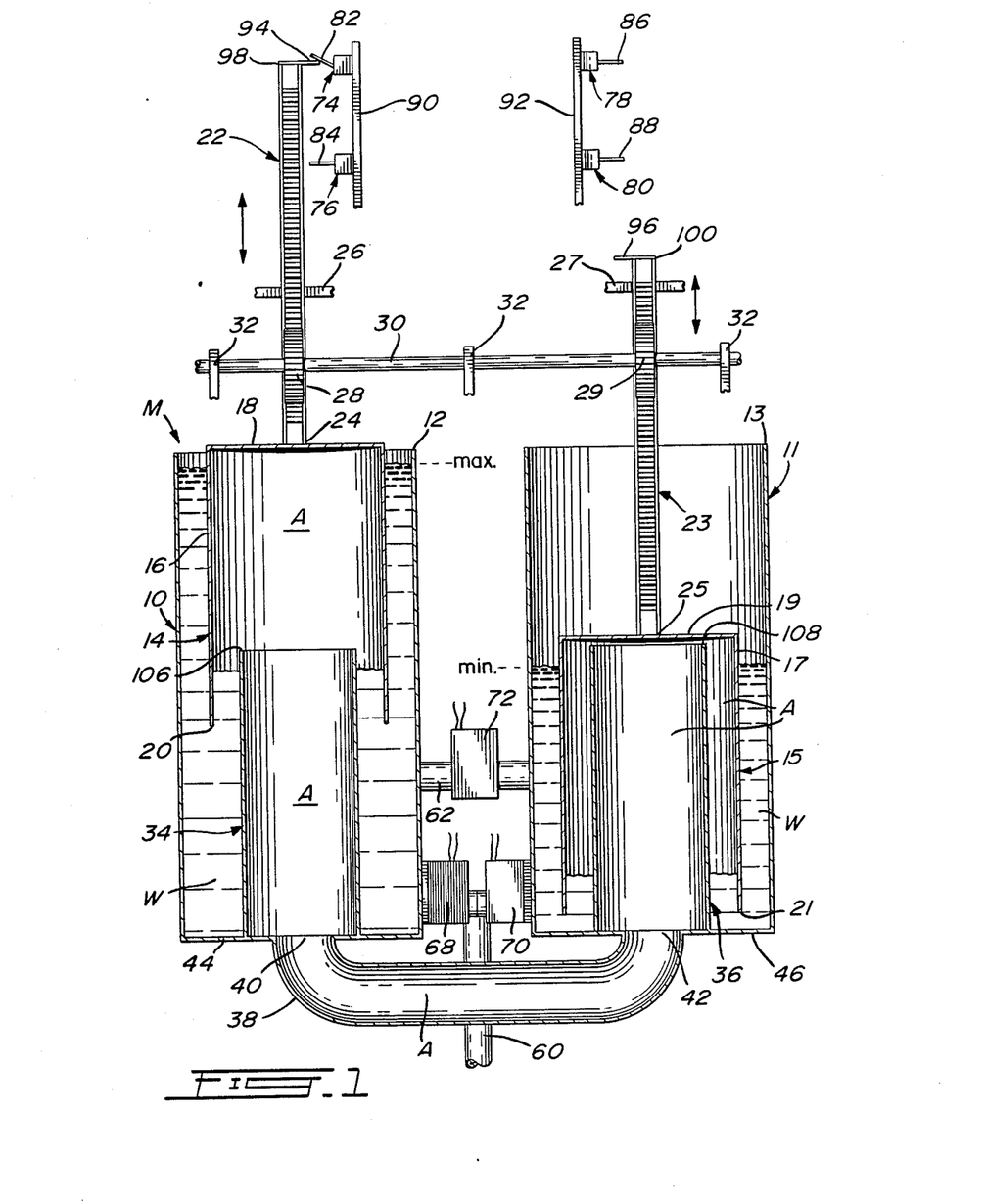
FIG. 1 is a front elevation partly in cross-section of a hydraulic motor showing the pistons at the end of a stroke thereof.

Referring mainly to FIG. 1, a hydraulic motor M includes first and second cylindrical tanks 10 and 11 that are open-ended at respective top ends 12 and 13 thereof for respectively receiving in a longitudinal and concentrical way first and second pistons 14 and 15 comprising respective top walls 18 and 19 and side walls 16 and 17. The pistons 14 and 15 are also of cylindrical shape and are open-ended at respective bottom ends 20 and 21 thereof. The tanks 10 and 11 have twice the height dimension of the respective pistons 14 and 15.

Figures 3, 4:
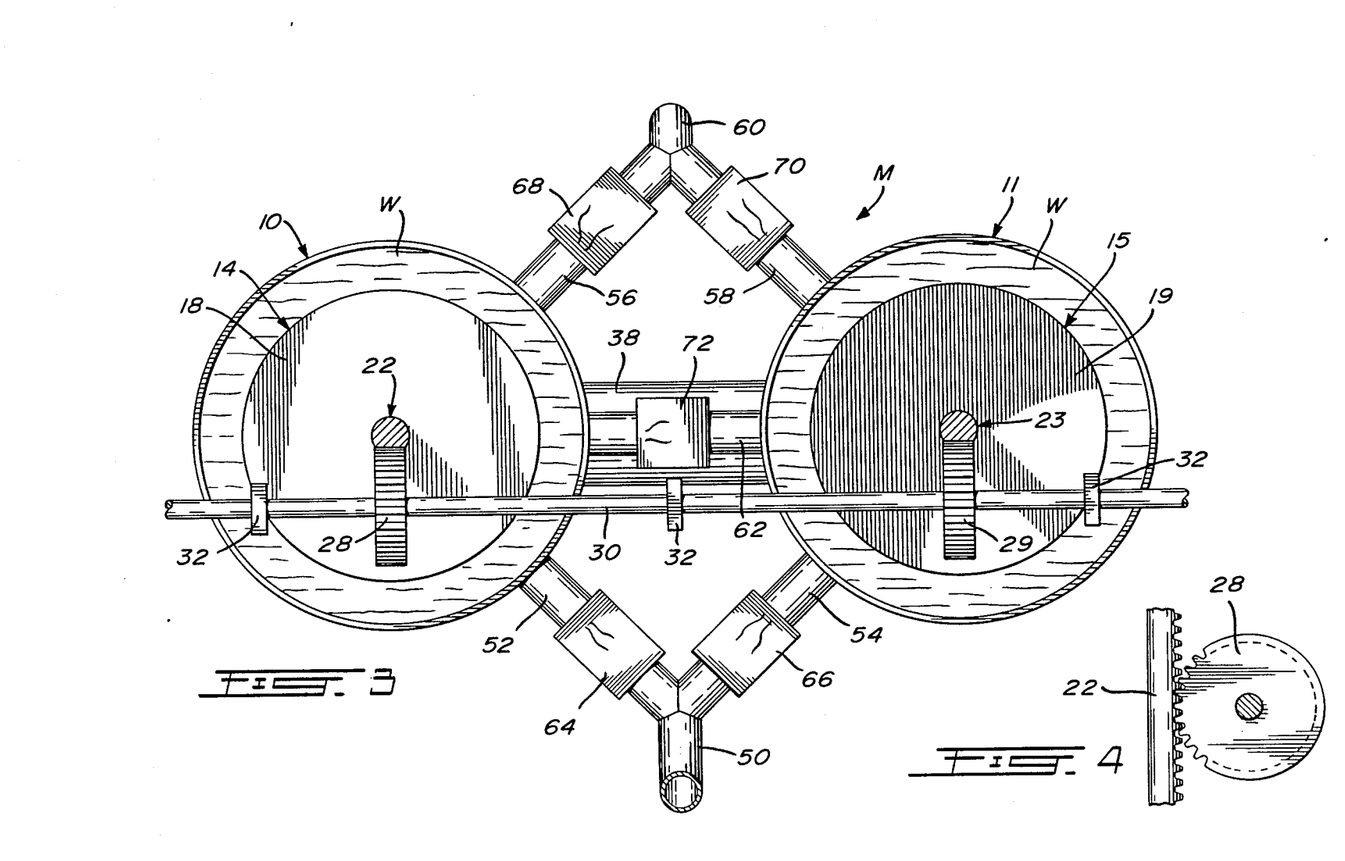
FIG. 3 is a top plan view of the hydraulic motor.
FIG. 4 is a fragmentary enlarged cross-section of the left-side elevation of FIG. 1, showing the rack and the ratchet-type gear (pinion) meshing.

First and second racks 22 and 23 are fixedly mounted at respective bottom ends 24 and 25 thereof to respective top walls 18 and 19. Guides 26 and 27 respectively prevent the racks 22 and 23 from any lateral deviation while allowing vertical movement thereof. The racks 22 and 23 respectively mesh with first and second pinions 28 and 29 which are fixedly mounted to a shaft 30. The shaft 30 is rotatably mounted to anchored shaft supports 32. Each pinion 28 and 29 is provided with ratchet-type gear means so as to rotate only and, thus, power the shaft 30 on an upward movement of one of the respective racks 22 and 23. A detailed description of the movements involved will follow the description of the structure of the hydraulic motor M.

First and second elongated open cylinders 34 and 36 are mounted at a lower end thereof to a respective bottom wall of the tanks 10 and 11. The open cylinders 34 and 36, concentrically located within the tanks 10 and 11, have substantially the same height dimension as that of the pistons 14 and 15, but are of smaller diameter. The first and second open cylinders 34 and 36 communicate by way of a large diameter pipe 38 connecting a pair of openings 40 and 42 respectively defined on bottom walls 44 and 46 of the tanks 10 and 11 and within the open cylinders 34 and 36, as best seen in FIG. 1.

The pistons 14 and 15 and the open cylinders 34 and 36 respectively associated therewith form a pair of variable volume air chambers as the pistons 14 and 15 described a reciprocating movement onto the respective open cylinders 34 and 36 and within the tanks 10 and 11. The pipe 38 allows air to transfer from the air chamber associated with the piston 14 or 15 moving downwardly to the air chamber associated with the other piston 14 or 15 which is moving upwardly. The two variable volume air chambers and the pipe 38 thus form a constant volume air chamber, wherein, obviously, the air pressure remains substantially constant.

The tanks 10 and 11 contain enough water W to surround the pistons 14 and 15. The pistons 14 and 15, the open cylinders 34 and 36, and the tubing 38 are filled with air A, the pressure of which dictates the difference in the water levels on each side of the side walls of the pistons 14 and 15.

As the pressure of the air A remains constant throughout the reciprocating movements of the pistons 14 and 15, the water levels on each side of the side walls 16 and 17 thus remain immobile relative to the pistons 14 and 15 and, therefore, the water is unable to leak into the open cylinders 34 and 36. The water W required in the tanks 10 and 11 must surround the pistons 14 and 15 to allow the same to float under the buoyancy phenomenon.

Figure 2:
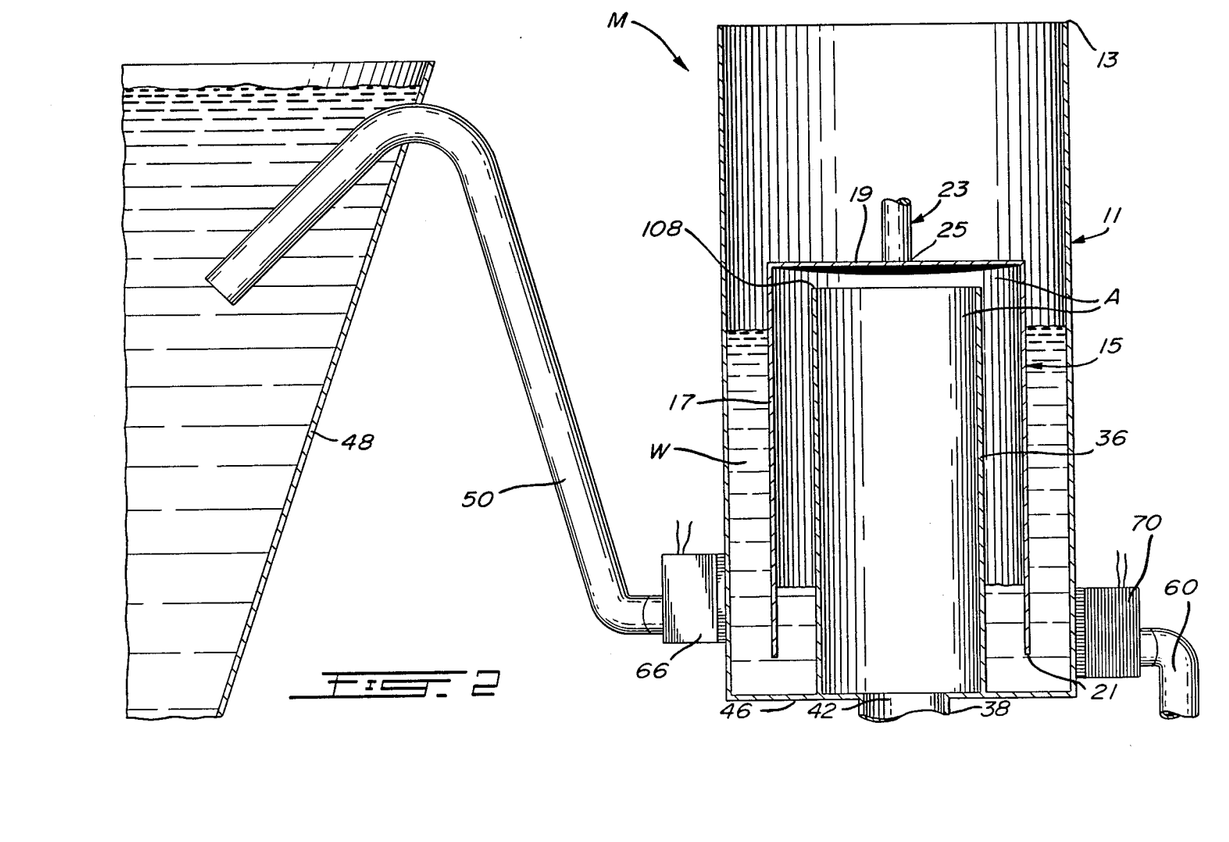
FIG. 2 is a right-side elevation of the hydraulic motor, also showing the storage basin and the water supply means.

To supply water to the tanks 10 and 11, a water storage basin 48 is used as well as a main supply pipe 50 (see FIG. 2). As best seen in FIG. 3, the main pipe 50 splits at a lower end thereof into a first and a second pipe 52 and 54 for respectively supplying water to the tanks 10 and 11 through a first pair of openings each being defined on a side wall of one of the tanks 10 and 11 and near the bottom wall thereof. The first and second pipes 52 and 54 open up into tanks 10 and 11 near the bottom wall thereof and are always immersed in water thereat. Because the water level in the storage basin 48 is higher than the maximum level attainable in the tanks 10 and 11, the pipes 50, 52, and 54 act as siphons to supply water to the tanks 10 and 11.

The evacuation of the tanks 10 and 11 is ensured by way of a second pair of openings defined on the side walls of the tanks 10 and 11, opposite the first pair of openings and low enough for the evacuation to be carried out by gravity.

A third and fourth pipe 56 and 58 are connected at a first end thereof to the second pair of openings. The third and fourth pipes 56 and 58 join at a second end thereof for forming a main evacuation pipe 60.

An increase of the amount of water W in one of the tanks 10 or 11 coupled with a corresponding reduction in the other tank results in an upward movement of the piston 14 or 15 associated with the tank 10 or 11 being filled up and in a downward movement of the other piston. Air contained in the piston 14 or 15 moving downwardly transfers to the other piston by way of the tubing 38 and the open cylinders 34 and 36.

Water supply and evacuation could be respectively assumed entirely by the supply pipes 50, 52, and 54 and by the evacuation pipes 56, 58, and 60. But since for every water increase in one of the tanks 10 or 11, there is a corresponding decrease in the other, a transfer pipe 62 is added, in this preferred embodiment, to connect the tanks 10 and 11. The transfer pipe 62 is located substantially midway between the maximum and the minimum level of water in the tanks 10 and 11 inside the pistons 14 and 15, as can be seen in FIG. 1, for substantially allowing half the water contained in the full tank 10 or 11 to be transferred by gravity to the other tank, thus requiring about 50% less water from the storage basin 48.

Solenoid valves 64, 66, 68, 70, and 72 respectively control the water flow through the first and second supply pipes 52 and 54, the first and second evacuation pipes 56 and 58, and the transfer pipe 62.

Mechanical-electrical switches 74, 76, 78, and 80 control the valves 64, 66, 68, 70, and 72 through relays (not shown) in a way further described hereinafter. The switches 74, 76, 78, and 80 respectively comprise a movable part 82, 84, 86, and 88. The switches 74 and 76 are fixedly mounted on a first mounting means 90, and the switches 78 and 80 are similarly mounted to a second mounting means 92 (see FIG. 1).

First and second actuating means 94 and 96 are respectively mounted at top ends 98 and 100 of the racks 22 and 23, extending towards the switches 74, 76, 78, and 80 (see FIG. 1). The pistons 14 and 15 each have a lower and an upper end stroke position within respective tanks 10 and 11. The piston 14, on an upward movement thereof starting at the lower end stroke position thereof, first produces an upwardly pivoting movement of the movable part 84 of the switch 76. Concurrently, the piston 15, moving downwardly from the upper end stroke position thereof, produces the downwardly pivoting movement of the movable part 86 of the switch 78. The upwardly pivoting movement of each of the movable parts 82, 84, 86, and 88 triggers a different valve response, whereas the downward movements of the same are without effect on the values 64, 66, 68, 70, and 72, in this embodiment. Therefore, for a full cylce of the motor M, starting with the piston 14 being at the lower end stroke position thereof, different signals to the valves 64, 66, 68, 70, and 72 will be alternately produced by the switches 76, 74, 80, and 78.

Each switch 74, 76, 78, and 80, following the upward movement of the movable parts 82, 84, 86, and 88 respectively connected thereto, release a signal for energizing the coil of one or more relays so as to produce a different and appropriate motor response from the valves 64, 66, 68, 70, and 72.

Switches 74 and 78 are vertically located for being substantially triggered by actuating means 94 and 96 at the end of the upward stroke of the respective pistons 14 and 15. Switches 76 and 80 are positioned for releasing a signal on the upward movement of the respective pistons 14 and 15 substantially at half stroke thereof, i.e. when the quantity of water W in each of the tanks 10 and 11 is equal.

Figure 5:
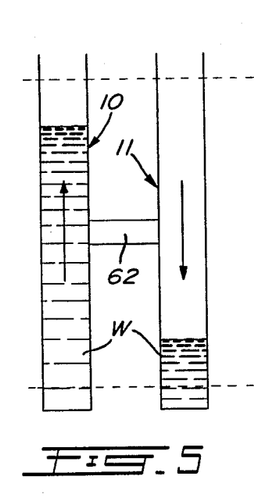
FIGS. 5 through 9 schematically illustrate both tanks through at least a full cycle.

FIGS. 5 through 9 illustrate the successive filling and emptying of the tanks 10 and 11 with the use, where applicable, of the transfer pipe 62. The arrows show the water level directions. FIGS. 6 through 9 show a full cycle of the motor M, each illustrating a water level for which one of the switches 74, 76, 78, and 80 releases a signal. FIG. 5 shows an intermediate level for which no signal is given to the valves.

In FIG. 5, the water level in the first tank 10 increases as a result of water from the storage basin 48 flowing through the pipes 50 and 52 and the open valve 64 into the tank 10. Simultaneously, water flows out of the second tank 11 by way of the pipes 58 and 60 and the open valve 70. The valves 66, 68, and 72 are in the closed position thereof. Through the pipe 38, the air A transfers from the second pistion 15 to the first piston 14 which are following the water levels and keeping the air presssure constant. The first actuating means 94 of the first rack 22 moves upwardly towards the movable part 82 of the switch 74. The actuating means 94 causes the movable part 82 to pivot upwardly as the water in the tank 10 reaches the maximum level thereof and the water in the tank 11, the minimum level thereof (see FIG. 6). The switch 74 sends a signal to close valves 64 and 70 and to open the valve 72 which controls the water flow through the transfer pipe 62.

Figure 6:
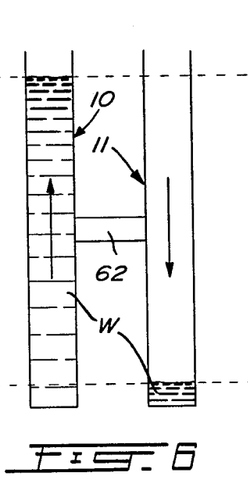
Figure 7:
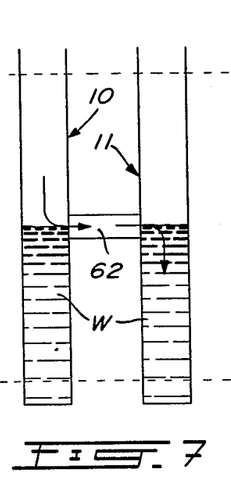

From FIG. 6 to FIG. 7, water transfers by gravity from the first tank 10 to the second tank 11 through the transfer pipe 62. Air transfers from the first piston 14 to the second piston 15, the pistons 14 and 15 respectively moving downwardly and upwardly. When the water is substantially level with the transfer pipe 62, the water levels in both tanks 10 and 11 are similar and the transfer by gravity is no longer possible (see FIG. 7). However, at that level, the second actuating means 96 of the second rack 23 which is moving upwardly causes the movable part 88 of the switch 80 to pivot upwardly, thus sending a signal for opening the admission valve 66 for the tank 11 and the evacuation valve 68 for the tank 10 and for closing the valve 72 of the transfer pipe 62.

Figure 8:
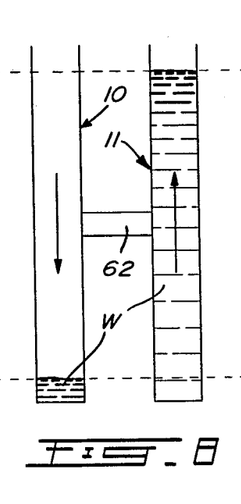

Therefore, from FIG. 7 to FIG. 8, water is admitted to the tank 11 and evacuated from the tank 10 respectively by way of the open valves 66—and the pipes 50 and 54—and 68—and the pipes 58 and 60. Air continues to transfer from the downwardly moving first piston 14 to the upwardly moving second piston 15 through the pipe 38. When the water in the tank 11 reaches the maximum level thereof (see FIG. 8), the second actuating means 96 causes the movable part 86 of the switch 78 to pivot upwardly, thus sending a signal for closing the valves 66 and 68 and for opening the valve 72 on the transfer pipe 62.

Figure 9:
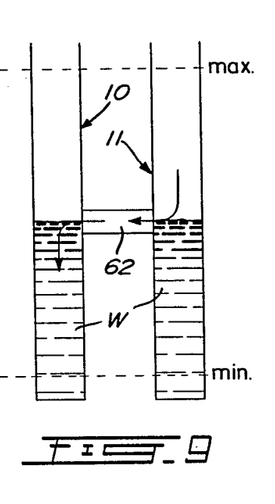

From FIG. 8 to FIG. 9, water transfers by gravity from the second tank 11 to the first tank 10 through the transfer pipe 62 and the valve 72 mounted thereon, as all other valves are in the closed position thereof. The pistons 14 and 15 follow the water levels of the respective tanks 10 and 11 as air transfers from the second piston 15 to the first piston 14. When the water levels coincide (see FIG. 9), the transfer of water by gravity is replaced by the storage basin 48 supplying water to the first tank 10 through the admission valve 64 and by water drainage of the second tank 11 through the evacuation valve 70. The valves 64 and 70 are opened while the valve 72 on the transfer pipe 62 is closed following the signal released by the switch 76 which resulted from the upward movement of the rack 22. As the water levels reach that seen in FIG. 6, the cycle hereinabove described (FIGS. 6 through 9) starts over and is repeated so as to rotatably drive the shaft 30, allowing the power developed by the hydraulic motor M to be available in a simple way for use thereof.

As previously mentioned, the tanks 10 and 11 have substantially twice the height dimension as the pistons 14 and 15 and of the open cylinders 34 and 36. The downward stroke of the pistons 14 and 15 is limited by the top walls 18 and 19 thereof nearing respective top ends 106 and 108 of the open cylinders 34 and 36. Thus, the pistons 14 and 15 and the open cylinders 34 and 36 require substantially the same height dimension. For the water W not to leak into the open cylinders 34 and 36 through the top ends 106 and 108 thereof, the bottom ends 20 and 21 must always cover at least part of the open cylinders 34 and 36. Thus, the height dimension of the tanks 10 and 11 need not exceed substantially twice that of the pistons 14 and 15.

The amount of water W required is that needed to surround the pistons 14 and 15, thus avoiding air A leaking from the previously defined cnstant volume air chamber and allowing pistons 14 and 15 to float. Therefore, the differences between the diameters of the tanks 10 and 11, the pistons 14 and 15, and the open cylinders 34 and 36, are determined by the requirement of having enough water W to surround the pistons 14 and 15 to provide buoyance and by the precision of the construction of the motor M. The differences between the aforementioned diameters tend to be minimal within those limits so that the motor M requires a minimum amount of water per cycle.

The limits pertaining to the construction of the motor M are determined by the verticality of the side walls of the tanks 10 and 11, the pistons 14 and 15, and the open cylinders 34 and 36, and also on the verticality, stability, and consistency of the reciprocating movement of each of the pistons 14 and 15, and thus on the guides 25 and 26 and on the proper meshing of the pinions 28 and 29 with respective racks 22 and 23.

In a specific example, the tanks 10 and 11 each have a diameter of 2.0 m. and a height jof 2.0 m. The pistons 14 and 15 each have a diameter of 1.80 m. and a height of 1.0 m. The open cylinders 34 and 36 each have a diameter of 1.60 m. and a height of 1.0 m. These dimensions provide a distance of 10 cm. between the adjacent side walls of the tanks 10 and 11, the pistons 14 and 15, and the open cylinders 34 and 36.

Figure 10:
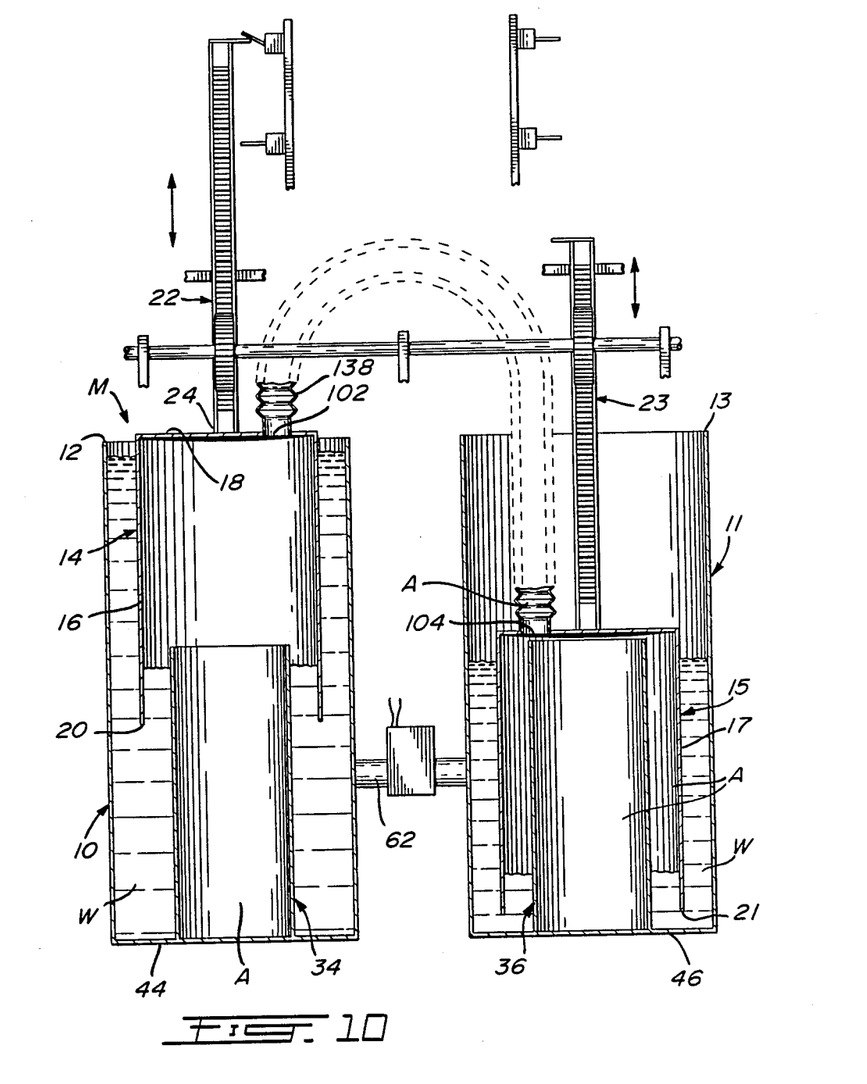
FIG. 10 is a view, similar to FIG. 1, illustrating a modified embodiment, and more specifically, wherein an alternate means is shown for allowing the air to transfer between the pistons.

In another embodiment, seen in FIG. 10, the air A transfers alternately between the first and second pistons 14 and 15 by way of a flexible tube 138 connecting a pair of openings 102 and 104, defined respectively on the top walls 18 and 19 thereof, thus replacing the openings 40 and 42 defined on the respective bottom walls 44 and 46 of each of the tanks 10 and 11 and the pipe 38 connected thereto, which are best seen in FIG. 1.

To summarize, the present hydraulic motor, when compared with the prior art, replaces a large amount of the water needed by air contained in a pair of coupled variable volume floats. Basically, the amount of water used is that which is needed to surround the floats. A large quantity of water is, therefore, economized. The transfer pipe 62 saves approximately an additional 50% of water. The high fluidity of the air results in minimum energy losses. The air A transfers from one float to the other in a closed cycle, the pressure thereof thus remaining constant. The air pressure inside the floats accounts for the difference in the water levels on each side of the side walls of the pistons. The alternate reciprocating movement of the pistons imparts, through rack and ratchet-type pinion means, a rotating motion to a shaft to provide a power output.

I claim:

1. A hydraulic motor comprising:
   at least a first and second tank means, each tank means having a bottom wall and a peripheral upstanding side wall for containing water;
   an upstanding first tubular member extending upwardly from the bottom wall and spaced inwardly from the side wall of the tank means and defining a space therewith, the first tubular member being open at the top and a second tubular member having a top wall and a peripheral side wall having inner transverse dimensions greater than the outer transverse dimensions of the first tubular member and less than the inner transverse dimensions of the side wall of the tank means such that the second tubular member can telescope onto the first tubular member within the tank means;
   guide means for guiding telescopic reciprocating movement of the second tubular member relative to the first tubular member;
   means for supplying water from a water supply source to said space between a side wall of the first tubular member and the side wall of the tank means, the water being effective to float the second tubular member and move said second tubular member along said guide means to an upper limit in said tank means from a lower limit in said tank means in a telescopic extended position relative to said first tubular member from a telescopic compressed position;
   a gaseous fluid provided within a variable volume first chamber defined by the first and second telescopic tubular members arrangement and conduit means communicating between the first chamber in the first tank means with a second variable volume chamber defined by the arrangement of the first and second telescopic tubular members in the second tank means in order to maintain a constant pressure in the first and second chambers;
   means for alternately supplying to and exhausting water from the first and second tank means whereby the telescopic first and second tubular arrangements in the respective tank means are alternately extended and compressed by means of the water rising or lowering in said space in the respective tank means, and means coupled to the second tubular members in each of the first and second tank means for extracting the mechanical energy derived from the reciprocal movement thereof.

2. A hydraulic motor comprising a hydraulic fluid source, at least first and second tank means of large transverse dimensions, each including central pneumatic, telescopic piston and cylinder arrangements defining variable volume pneumatic chambers within the tank means, narrow spaces being defined between the tank means and the chambers into which water can be supplied sufficient to float the piston of the respective piston and cylinder arrangements;
   means for alternately supplying and exhausting water to the first and second tank means, and a conduit means between the pneumatic chambers for regulating the gaseous pressure therein, whereby said pistons produce mechanical work as the pistons and cylinders are caused to expand and compress.

3. A hydraulic motor according to claim 1, wherein the first and second tank means and the first and second tubular members are of cylindrical shape.

4. A hydraulic motor according to claim 2, wherein the first and second tank means and the piston and cylinder of the piston and cylinder arrangements are of cylindrical shape, whereby said narrow spaces are of annular shape.

5. A hydraulic motor according to claim 3, wherein the first and second tubular members associated with each of the tank means are concentrically disposed therein, whereby said space is of annular shape.

6. A hydraulic motor according to claim 5, wherein the transverse distances between the side walls of each of the tank means and the side walls of the first and second tubular members associated therewith are such that a minimum amount of water is required for each cycle of the hydraulic motor while ensuring the floating by buoyancy of the second tubular members.

7. A hydraulic motor according to claim 6, wherein the height dimension of the first and second tubular members is slightly greater than half that of the tank means for maintaining at least part of the second tubular member onto the first tubular member.

8. A hydraulic motor according to claim 7, wherein at least a tubing means is used for horizontally connecting openings defined on the side wall of each tank means, said openings being defined on the side walls at a level for allowing gravity transfer of substantially half the water required for moving the second tubular member from the compressed position thereof to the extended position thereof from the tank means associated with the second tubular member in the extended position thereof to the tank means associated with the second tubular member in the compressed position thereof, said tubing means also being adapted with first flow controlling means.

9. A hydraulic motor according to claim 8, wherein the first flow controlling means adapted to the tubing means comprises a first valve means mounted intermediate the ends thereof.

10. A hydraulic motor according to claim 9, wherein the means for supplying water to the tank means comprises a Y-shaped tubing means including a first and a second arm, a common section, and a second flow controlling means, each of the tank means being adapted for receiving one of said arms of the Y-shaped tubing means, whereby water from the water supply source is alternately supplied to said tank means first through said common section and then through said arms of the Y-shaped tubing means.

11. A hydraulic motor according to claim 10, wherein the second flow controlling means adapted to the Y-shaped tubing means comprises a second and a third valve means, each being adapted to one of the arms thereof.

12. A hydraulic motor according to claim 11, wherein the water supply source includes a reservoir means, said Y-shaped tubing means being adapted thereto in order to function as a siphon.

13. A hydraulic motor according to claim 12, wherein the means for exhausting water comprises a pair of piping means including a third flow controlling means, a first end of each piping means of said pair of piping means being adapted to one of the tank means whereby water is alternately exhausted from said tank means.

14. A hydraulic motor according to claim 13, wherein said pair of piping means is connected to said tank means in order that water is gravity exhausted therefrom.

15. A hydraulic motor according to claim 14, wherein the third flow controlling means adapted to said pair of piping means comprises a fourth and a fifth valve means, each being adapted to one of said pair of piping means.

16. A hydraulic motor according to claim 15, wherein the conduit means communicating between the first and second variable volume air chambers connects a pair of openings, each being defined on the bottom wall of one of the tank means inwardly of the side walls of the first tubular member associated therewith.

17. A hydraulic motor according to claim 15, wherein the conduit means communicating between the first and second variable volume air chambers connects a pair of openings each being defined on the top wall of one of the second tubular members.

18. A hyraulic motor according to claim 16, wherein said means coupled to the second tubular members for extracting the mechanical energy derived from the reciprocating movement thereof comprises a first and a second rack means extending upwardly from the top wall of each of the second tubular members, each of the rack means meshing with pinion means provided with ratchet-type gearing means and mounted on at least one shaft, whereby the second tubular members alternately drive said shaft.

19. A hydraulic motor according to claim 18, wherein the guide means for guiding the telescopic reciprocating movement of the second tubular members supports each of the rack means in order to prevent any lateral deviation thereof while allowing a substantially vertical movement thereof.

20. A hydraulic motor according to claim 19, wherein control means are provided for controlling the first, second, third, fourth, and fifth valve means, thereby ensuring the reciprocating movement of each of the second tubular members and the alternate movement of both second tubular members.

21. A hydraulic motor according to claim 20, wherein said valve means each comprises a solenoid valve actuated by said control means, said control means including mechanical-electrical switching means, relay means, and electrical power source and distributing means.

* * * * *

UNITED STATES PATENT AND TRADEMARK OFFICE
CERTIFICATE OF CORRECTION

PATENT NO. : 4,838,025

DATED : June 13, 1989

INVENTOR(S) : Marc Nelis

It is certified that error appears in the above-identified patent and that said Letters Patent is hereby corrected as shown below:

In column 1, line 16, "bouyant" is to read --buoyant--.

In column 3, lines 31-32, "described" is to read
    --describe--.

In column 4, line 61, "values" is to read --valves--;
            line 62, "cylce" is to read --cycle--.

In column 5, line 28, "pistion" is to read --piston--.

In column 6, line 40, "buoyance" is to read --buoyancy--;
            line 54, "jof" is to read --of--.

Signed and Sealed this

Ninth Day of October, 1990

Attest:

HARRY F. MANBECK, JR.

Attesting Officer

Commissioner of Patents and Trademarks